United States Patent Office 3,375,060
Patented Mar. 26, 1968

3,375,060
METHOD OF PRODUCING HYDROGEN FLUORIDE AND SOLUBILIZED BERYLLIUM
Robert S. Olson, Concord, Elmer C. Tveter and Joseph P. Surls, Walnut Creek, Calif., and Raymond G. Shaw, Lake Jackson, Tex., assignors to The Dow Chemical Company, Midland, Mich., a corporation of Delaware
No Drawing. Filed July 31, 1964, Ser. No. 386,778
13 Claims. (Cl. 23—15)

ABSTRACT OF THE DISCLOSURE

A process for simultaneously producing hydrogen fluoride and solubilizing beryllium values in a beryllium containing mineral by reacting a beryllium-containing mineral and fluoride in predetermined ratios with sulfuric acid at a temperature of from 200 to about 300° C. and atmospheric pressure.

This invention relates to a method of simultaneously producing hydrogen fluoride and solubilizing beryllium values in a mineral, and more particularly to a method for obtaining water soluble beryllium sulfate from beryllium-containing minerals employing mild conditions of temperature and pressure.

Previously employed methods of solubilizing beryllium values in minerals were generally directed to the mineral beryl, and used extreme temperatures or pressures or combinations thereof for at least one phase of the treatment. In one such method, beryl was heated to a temperature of about 1600 degrees centigrade in an electric arc furnace and then quenched in cold water to physically shatter the mineral.

It is an object of the present invention to provide a simple, direct method of solubilizing beryllium values in a beryllium containing mineral.

It is another object of the present invention to provide for the simultaneous production of hydrogen fluoride as well as water soluble beryllium sulfate.

These and other objects of the present invention will become apparent in the course of the following specification and claims.

In accordance with the present invention, a beryllium-containing mineral and fluorite ($CaF_2$) are reacted with sulfuric acid at a temperature of from 200 to about 300 degrees centigrade and atmospheric pressure, thereby to liberate gaseous hydrogen fluoride and convert the beryllium values to water soluble beryllium sulfate which readily can be separated from calcium sulfate produced as a principal by product.

The method of the present invention may be carried out in batch process or continuously, as desired. Hydrogen fluoride is withdrawn from the reaction zone as a gaseous product and may be collected by any satisfactory means. Crude beryllium sulfate is recovered as a solid acid cake product, generally in admixture with calcium sulfate. Separation of beryllium values from the solid calcium sulfate may readily be accomplished as by water leaching with subsequent concentration, or any other desired means.

Generally, in carrying out the present novel process, fluorite and a beryllium-containing mineral are employed in a weight ratio of from about 500:1 to about 35:1 and preferably from about 500:1 to about 100:1 based on the $CaF_2$/Be weight ratio.

Weight ratios of fluorite to beryllium less than about 35:1 can be used. However, when such ratios are employed, the percentage recovery of beryllium values generally tends to decrease.

Sulfuric acid, in the method of the present invention, is operably employed in an amount of at least one gram of $H_2SO_4$ per gram of fluorite and beryllium-containing mineral. Usually, sulfuric acid is present in an amount of from about one to about two grams and desirably in an amount of from about 1.3 to about 1.5 grams of $H_2SO_4$ per gram of fluorite and beryllium-containing mineral. Preferably, 1.4 gram of $H_2SO_4$ per gram of fluorite and beryllium-containing mineral is employed.

Preferably concentrated sulfuric acid is employed, i.e., acid containing at least about 96 percent by weight $H_2SO_4$. However, sulfuric acid containing as a minimum about 60 percent by weight $H_2SO_4$ can be used.

Equipment employed should be capable of handling fluorite and beryllium-containing minerals in the desired physical form and should be substantially non-reactive with either the feed stock materials or the products of the reaction. Stainless steel is generally adequate for the reactor material, but engineering practice may rule in favor of other materials.

Examples of beryllium-containing minerals suitable for use in the method of this invention are:

phenakite ($2BeO \cdot SiO_2$)
beryl ($3BeO \cdot Al_2O_3 \cdot 6SiO_2$)
helvite ($3(Mn,Fe)BeSiO_4 \cdot MnS$)
bertrandite ($4BeO \cdot 2SiO_2 \cdot H_2O$)
eudidymite ($HNaBeSi_3O_6$)
chrysoberyl ($BeO \cdot Al_2O_3$)

and barylite ($BaBe_2Si_2O_7$)

Fluorite ores generally contain other materials as well; usually calcite ($CaCO_3$) is present and minor amounts of iron, aluminum or beryllium silicates may also be present. Calcite in large amounts is generally undesirable in the present process since $CO_2$ is likely to be produced, thereby contaminating the desired HF product. It is, therefore, desirable to remove calcite prior to using the fluorite in the present process. When beryllium is present in the fluorite ore, it also is desirable to selectively remove the calcite without substantial loss of beryllium.

Calcite may be preferentially removed from fluorite ores by treating the ore with $SO_2$ in the presence of water. Unexpectedly, $CO_2$ in the calcite is replaced by $SO_2$ to form soluble $Ca(HSO_3)_2$ without "take up" of beryllium mineral which may be present.

Treatment of the fluorite ore with $SO_2$ to remove calcite is preferably carried out with the fluorite in an aqueous slurry. Sulfur dioxide may be introduced to the aqueous slurry in gaseous form, or may be introduced in a water solution as $H_2SO_3$. Calcite is thereby converted to water soluble $Ca(HSO_3)_2$ and $CO_2$. Fluorite, substantially free of calcite and suitable for use in the present method, is separated from the water slurry by any desirable means such as centrifuging, decanting, or the like.

The water solution may be heated to drive off $SO_2$ gas and precipitate water insoluble $CaSO_3$. The $SO_2$ may be further used in treatment of fluorite ore to remove calcite, or for any other purpose. Precipitated $CaSO_3$ may be calcined to produce $SO_2$ gas and $CaO$, both of which are useful products. Again, the $SO_2$ may be further used in the treatment of fluorite ore to remove calcite.

When iron or aluminum are present in amounts sufficient to contaminate the beryllium values obtained by the present method, another process step advantageously may be employed. The final acid cake containing water soluble $BeSO_4$ may be calcined at temperatures of from about 500 to about 600 degrees centigrade prior to water leaching. In this manner, the iron and aluminum are rendered less water soluble, thereby substantially freeing the desired water leached beryllium values of iron or aluminum contamination.

A better understanding of the present invention may be obtained in light of the following examples which are set forth to illustrate, and are not to be construed to limit, the present invention.

Example 1

A ground fluorite ore sample containing primarily fluorite ($CaF_2$) and calcite ($CaCO_3$) and about 0.25 weight percent beryl was slurried with water and reacted with sulfur dioxide ($SO_2$) gas at room temperature to reduce the calcite content from 8.3 to 0.1 percent. After filtering, washing, and drying, the fluorspar-containing aggregate was mixed with finely ground beryl to give a mixture having a beryllium content of 0.62 percent. 331 grams of the solid mixture were reacted in a stainless steel reactor with 475 grams of concentrated sulfuric acid (96 weight percent $H_2SO_4$) at a temperature of from about 220 to about 300 degrees centigrade at atmospheric pressure. Gases produced (HF and $SiF_4$) were identified but not collected. Reaction was continued for about two hours.

After reaction, the solid residue, which was primarily calcium sulfate and contained beryllium sulfate, was removed from the reactor and water leached. About 92 percent of the available beryllium was recovered in the leach liquor.

Example 2

In substantially the same manner set forth in Example 1, gaseous hydrogen fluoride and solid beryllium sulfate may be produced substituting phenakite, helvite, bertrandite, eudidymite, barylite, chrysoberyl, or mixtures thereof for the beryl employed in Example 1.

Various modifications of the present invention may be made without departing from the spirit or scope thereof and it is to be understood that we limit ourselves only as defined in the appended claims.

We claim:

1. A method of producing hydrogen fluoride and rendering beryllium values in a beryllium-containing mineral water soluble comprising, (1) introducing a beryllium-containing mineral and fluorite to a reactor in a weight ratio of calcium fluoride to beryllium of from about 500:1 to about 35:1, (2) introducing sulfuric acid to the reactor in an amount of at least one gram of $H_2SO_4$ per gram of fluorite and beryllium-containing mineral, (3) reacting the reaction mixture thus formed at a temperature of from about 200 to about 300 degrees centigrade and atmospheric pressure, and (4) removing hydrogen fluoride gas and solid acid cake containing beryllium sulfate from the reaction zone.

2. A method of producing hydrogen fluoride and rendering beryllium values in a beryllium-containing mineral water soluble comprising, (1) introducing beryllium-containing mineral and fluorite to a reactor in a weight ratio of calcium fluoride to beryllium of from about 500:1 to about 100:1, (2) introducing sulfuric acid to the reactor in an amount of from about one to about two grams per gram of fluorite and beryllium-containing mineral, (3) reacting the reaction mixture thus formed at a temperature of from about 200 to about 300 degrees centigrade and atmospheric pressure, and (4) removing hydrogen fluoride gas and solid beryllium sulfate from the reaction zone.

3. A method of producing hydrogen fluoride and rendering beryllium values in a beryllium-containing mineral water soluble comprising, (1) introducing beryllium-containing mineral and fluorite to a reactor in a weight ratio of calcium fluoride to beryllium of from about 500:1 to about 100:1, (2) introducing sulfuric acid to the reactor in an amount of from about 1.3 to about 1.5 grams per gram of fluorite and beryllium-containing mineral, (3) reacting the reaction mixture thus formed at a temperature of from about 200 to about 300 degrees centigrade and atmospheric pressure, and (4) removing hydrogen fluoride gas and solid beryllium sulfate from the reaction zone.

4. The method of claim 1 wherein the fluorite is treated with $SO_2$ in the presence of water prior to step (1) of said claim 1, thereby to substantially remove calcite which may be present with the fluorite.

5. The method of claim 1 wherein the fluorite is treated with $SO_2$ in the presence of water prior to step (1) of said claim 1, thereby to substantially remove calcite which may be present with the fluorite, and the solid acid cake containing beryllium sulfate obtained in step (4) of said claim 1 is calcined at a temperature of from about 500 to about 600 degrees centigrade.

6. A method of producing hydrogen fluoride and rendering beryllium values in a mineral water soluble comprising, (1) introducing fluorite and beryl to a reactor in a weight ratio of calcium fluoride to beryllium of from about 500:1 to about 35:1, (2) introducing sulfuric acid to the reactor in an amount of at least one gram of $H_2SO_4$ per gram of fluorite and beryl, (3) reacting the reaction mixture thus formed at a temperature of from about 200 to about 300 degrees ecntigrade and atmospheric pressure, and (4) removing hydrogen fluoride gas and solid acid cake containing beryllium sulfate from the reaction zone.

7. A method of producing hydrogen fluoride and rendering beryllium values in a mineral water soluble comprising, (1) introducing fluorite and phenakite to a reactor in a weight ratio of calcium fluoride to beryllium of from about 500:1 to about 35:1, (2) introducing sulfuric acid to the reactor in an amount of at least one gram of $H_2SO_4$ per gram of fluorite and phenakite, (3) reacting the reaction mixture thus formed at a temperature of from about 200 to about 300 degrees centigrade, and atmospheric pressure, and (4) removing hydrogen fluoride gas and solid acid cake containing beryllium sulfate from the reaction zone.

8. A method of producing hydrogen fluoride and rendering beryllium values in a mineral water soluble comprising, (1) introducing fluorite and helvite to a reactor in a weight ratio of calcium fluoride to beryllium of from about 500:1 to about 35:1, (2) introducing sulfuric acid to the reactor in an amount of at least one gram of $H_2SO_4$ per gram of fluorite and helvite, (3) reacting the reaction mixture thus formed at a temperature of from about 200 to about 300 degrees centigrade and atmospheric pressure, and (4) removing hydrogen fluoride gas and solid acid cake containing beryllium sulfate from the reaction zone.

9. A method of producing hydrogen fluoride and rendering beryllium values in a mineral water soluble comprising, (1) introducing fluorite and bertrandite to a reactor in a weight ratio of calcium fluoride to beryllium of from about 500:1 to about 35:1, (2) introducing sulfuric acid to the reactor in an amount of at least one gram of $H_2SO_4$ per gram of fluorite and bertrandite, (3) reacting the reaction mixture thus formed at a temperature of from about 200 to about 300 degrees centigrade and atmospheric pressure, and (4) removing hydrogen fluoride gas and solid acid cake containing beryllium sulfate from the reaction zone.

10. A method of producing hydrogen fluoride and rendering beryllium values in a mineral water soluble comprising, (1) introducing fluorite and eudidymite to a reactor in a weight ratio of calcium fluoride to beryllium of from about 500:1 to about 35:1, (2) introducing sulfuric acid to the reactor in an amount of at least one gram of $H_2SO_4$ per gram of fluorite and eudidymite, (3) reacting the reaction mixture thus formed at a temperature of from about 200 to about 300 degrees centigrade and atmospheric pressure, and (4) removing hydrogen fluoride gas and solid acid cake containing beryllium sulfate from the reaction zone.

11. A method of producing hydrogen fluoride and rendering beryllium values in a mineral water soluble comprising, (1) introducing fluorite and chrystoberyl to a reactor in a weight ratio of calcium fluoride to beryllium of from about 500:1 to about 35:1, (2) introducing sulfuric acid to the reactor in an amount of at least one gram of $H_2SO_4$ per gram of fluorite and chrysoberyl, (3) reacting the reaction mixture thus formed at a temperature of from about 200 to about 300 degrees centigrade and atmospheric pressure, and (4) removing hydrogen fluoride gas and solid acid cake containing beryllium sulfate from the reaction zone.

12. A method of producing hydrogen fluoride and rendering beryllium values in a mineral water soluble comprising, (1) introducing fluorite and barylite to a reactor in a weight ratio of calcium fluoride to beryllium of from about 500:1 to about 35:1, (2) introducing sulfuric acid to the reactor in an amount of at least one gram of $H_2SO_4$ per gram of fluorite and barylite, (3) reacting the reaction mixture thus formed at a temperature of from about 200 to about 300 degrees centigrade and atmospheric pressure, and (4) removing hydrogen fluoride gas and solid acid cake containing beryllium sulfate from the reaction zone.

13. The method of claim 1 wherein said solid acid cake is calcined at a temperature of about 500 to about 600 degrees centigrade.

References Cited
UNITED STATES PATENTS

| | | | |
|---|---|---|---|
| 1,710,840 | 4/1929 | Price et al. | 23—24.2 X |
| 1,959,448 | 5/1934 | Staufer et al. | |
| 2,160,547 | 5/1939 | Jaeger et al. | 23—24.2 X |
| 3,025,131 | 3/1962 | Lerner | 23—19 X |
| 3,177,068 | 4/1965 | Mod et al. | 23—117 X |

OSCAR R. VERTIZ, *Primary Examiner.*

H. T. CARTER, *Assistant Examiner.*